INVENTORS
David E. Ruch &
Gerald D. Cole
Thomas N. Young
ATTORNEY

United States Patent Office

3,493,844
Patented Feb. 3, 1970

3,493,844
PULSED CURRENT REGULATOR
David E. Ruch, Goleta, and Gerald D. Cole, Los Angeles,
Calif., assignors to General Motors Corporation,
Detroit, Mich., a corporation of Delaware
Filed Jan. 18, 1968, Ser. No. 698,880
Int. Cl. H02j 1/04, 3/10
U.S. Cl. 323—4                                       9 Claims

ABSTRACT OF THE DISCLOSURE

System for regulation of current pulses supplied to a drive selection line of a magnetic memory. The regulator is compensated for the effects of temperature on the current switching devices and on the requirements of the load, as well as for internal regulator characteristics that would affect the accuracy of the regulating action. The regulator is switched between a normally nonconducting condition, in which the regulating section consumes no power during idle periods of the load, and a conducting and constant current supplying condition while a regulated pulse of current is driven through the load.

Background of the invention

The invention relates to current regulators and, more particularly, to a low power, constant current type regulator that is pulsed or turned on only during a read or write timing interval of a magnetic core memory when a pulse of current is driven through a memory core selection line.

Prior forms of regulators employed in such memory drive systems have been of the steady state variety wherein the regulator is continually on and draws power even during idle periods of the load or those times when information is not being read from or written into the memory.

One form of regulator employed in such applications uses a fixed monitoring resistance that is connected in series with the load through a power handling, current regulating device that is driven from the output of a high gain operational voltage amplifier. The amplifier is connected in a closed loop feedback control system and compares a fixed reference voltage with a sample of the voltage drop produced across the monitoring resistor by the current-to-be regulated. The regulating device is driven from the voltage amplifier in a manner to maintain a constant voltage equal to the reference voltage across the monitoring resistor.

Due to the relatively low bandwidth and long turn-on and turn-off transient response of the amplifier and the relatively short duration (one microsecond, e.g.) of the pulse driven through the load, such closed loop regulators do not admit of pulsed operation and must be on at all times, drawing power even when current is not supplied to the load. The needless drain of current and continuous consumption of power of such regulator devices used with low duty cycle loads of the character mentioned requires the use of costly power handling components, in addition to the operational amplifier, which is also an expensive item.

The present invention seeks to provide a current regulator that avoids the aforementioned objectional aspects of prior forms of current regulators used with pulse operated loads and has for its general object to provide an improved form of current regulator furnishing a regulated source of current for a pulse operated load device.

A specific object is to provide a pulsed current regulator which provides a regulated pulse of current to a drive selection line of a magnetic memory device without consumption of power in the regulator during memory idle periods.

Another object is to provide a pulsed current regulator which provides a regulated pulse of current to a selected one of a plurality of drive selection lines of a magnetic memory device and which is compensated for the effects of temperature on the load and on the switching devices that select or switch the current to the drive selection lines.

Another object is to provide a pulsed current regulator providing independent control over the rate of the rise of a pulse of current supplied therefrom to a drive selection line of a magnetic memory device.

Yet another object is to provide a pulsed current regulator that determines the width of a pulse of current driven through a drive selection line of a magnetic memory device.

Another object is to provide a current regulator using a relatively inexpensive transistor type constant current regulator section that is compensated for internal characteristics of the regulating section that would otherwise affect the accuracy of the regulating action.

Another object is to provide a power conserving, pulsed current regulator that is of simple and inexpensive construction, fast acting and yet capable of providing reliable regulation operation and performance within acceptable margins.

Description of drawings

The invention, both as to its organization and operation will be described more fully with respect to the accompanying description and drawings wherein.

Summary

In accordance with the invention there is provided a power conserving, pulsed current regulator for supplying a regulated pulse of drive current to a selection line of a magnetic memory device. The regulator comprises a temperature compensated stabilized reference voltage section, a normally nonconducting constant current transistor regulating section, a compensation section connected between the reference voltage section and the input to the regulating section to compensate the base-emitter junctions of the regulating transistors both for voltage drop and temperature variation, and a turn-on section that supplies bias for the compensating section and drive to turn on the regulating section upon the application of an external timing control pulse thereto.

Description of preferred embodiment

Figures 1, 2:
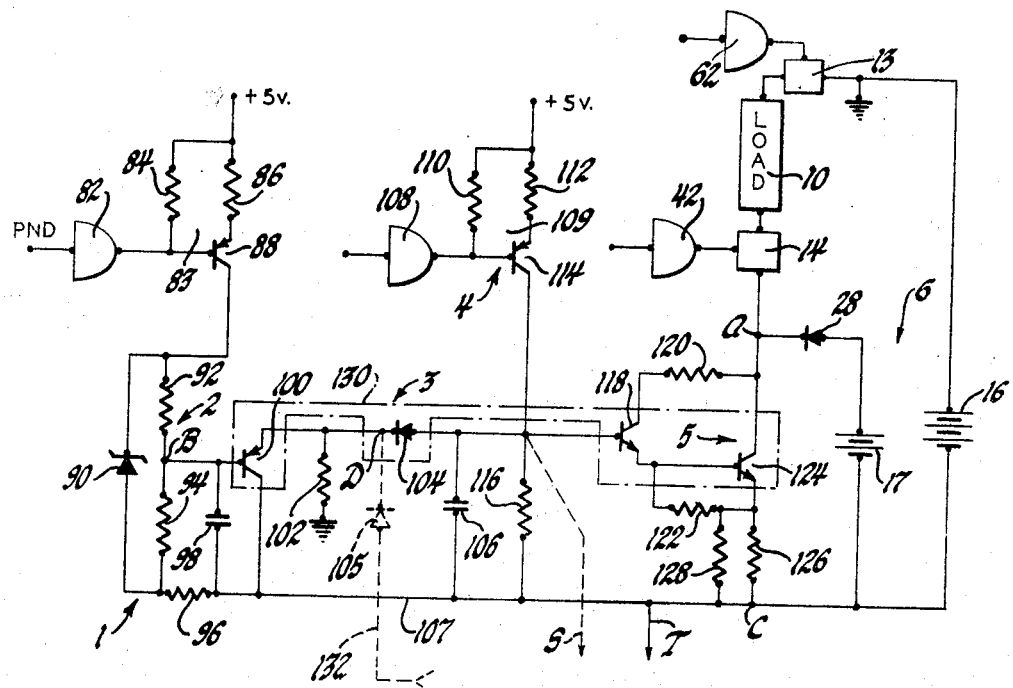
FIGURE 1 is a schematic electrical diagram of a pulsed current regulator in accordance with the present invention.
FIGURE 2 illustrates a modified form of pulse turn-on stage for providing a slower rate of rise or turn-on of the pulsed regulator than the pulse turn-on stage included in FIGURE 1.

With reference to the drawings, FIGURE 1 represents the electrical schematic circuit of a pulsed current regulator 1 in accordance with the present invention for providing a regulated pulse of current to a load 10 connected to one side of a source of potential 16 that drives the current through the load. The other side of the source of potential is connected to the return side or terminal designated as point "C" of the regulator, whose other or input terminal, designated as point "A," is connected to the load, which may be a magnetic memory stack.

The regulator 1 comprises a temperature compensated, stabilized voltage reference supply stage 2; a compensating stage 3; a pulsed regulator turn-on stage 4; a high gain current amplifier output stage 5; and a regulator power supply stage 6.

The voltage reference supply stage 2 is operated from a power turn-on and current supply section comprising gate 82 connected to the base of a PNP transistor 88 whose base is connected through a bias resistor 84 and its emitter is connected through a resistor 86 to a +5 v. supply. Transistor 88 is connected to operate as a constant current generator and supplies a precise current from its collector to the reference voltage developing section comprised of resistors 92, 94 and 96 and a breakdown or Zener diode 90. The diode is connected across resistors 92 and 94 and is operated by the voltage across resistors 92, 94 to maintain a stabilized reference voltage at the resistor junction, designated as point B herein.

The junction point of the resistors 92 and 94 is shown connected to the base of a PNP transistor 100 connected in an emitter follower type configuration with its collector connected to the return line 107 and its emitter connected through load resistor 102 to ground. The emitter of transistor 100 is also connected to the cathode side of a junction type diode 104 included in the compensating stage 3. The anode of diode 104 is connected to one side of a bias resistor 116, which is connected across the input of the regulating section to the negatively returned potential side 107 of the regulator.

The pulsed regulator turn-on stage 4 includes gate 108 and a constant current generator source 109 comprised of a PNP transistor 114 whose base is connected through a bias resistor 110 and whose emitter is connected through a resistor 112 to the +5 v. supply. The collector of 114 is connected to load resistor 116, the upper terminal side of which is connected to the input of the regulating section and to the anode of the diode 104, as shown.

The output stage 5 includes the NPN transistors 118 and 124 which are connected in a cascaded emitter-follower type circuit configuration known as a Darlington pair and constituting a high gain current amplifier. The collector of input or driver transistor 118 is connected through resistor 120 to the collector of the output power transistor 124, which is connected to input terminal point A of the regulator. The emitter of transistor 118 is directly connected to the base of output transistor 124, whose emitter is connected back to the emitter of transistor 118 through resistor 122, which provides turn-off bias and a leakage current path during turn-off for transistor 124. The emitter of transistor 124 is also connected through the current setting resistor 126 to the return potential side of the regulator connected to the low potential side of the source of potential 16 that drives the current through the load.

The regulator power supply stage 6 comprises a clamp diode 28 and voltage source 17 connected across the output stage of the regulator, as shown. The potential source 17 supplies the necessary operating or bias voltage to the collectors of the transistors 118 and 124 and furnishes current to the regulator when it is initially turned on and during those periods when the regulator may be on and no current is being driven from the load supply 16 through the load. The potential supply 17, employed in the described embodiment of the invention, is of a lower or lesser potential level, viz., 12 v. DC, than the stack supply 16, which is a 28 v. DC supply. The supply 16 is shown as a separate supply with its positive terminal connected to ground and its negative or low potential terminal connected to the return side of the regulator supply, whereby the voltage at point C will be 28 volts below ground, and the voltage at point A will be −17 v. DC or one diode drop below the −16 v. DC level of the side of the battery 17 connected to the anode of the clamp diode 28.

The gates 82 and 108 are similar type logic elements, which may be of T²L or transistor-transistor logic type circuit configuration provided in the computer with which the current regulator and magnetic memory are employed, and, when operated by an enabling or low logic level input thereto, produce a low logic level potential at the output thereof approximately +0.2 v. DC above ground reference level. When the computer is operational, a power normal delay signal (PND), indicating that power to the computer is not down, is applied to the gate 82 prior to the application of any read or write timing logic input to the regulator turn-on gate 108. The output of the gate 82 thus drops from +5 v. to +0.2 v. DC above ground to forward bias transistor 88, which previously was held off by the +5.0 v. DC bias applied to its base through resistor 84.

The +0.2 v. DC forward bias on the base of transistor 88 renders transistor 88 conducting in its linear active or nonsaturated region and clamps its emitter at +0.8 v. due to its base-to-emitter potential rise. With the emitter of transistor 88 clamped, there is a fixed voltage drop across resistor 86, causing a constant current to flow therethrough and in the collector output thereof. This current flows through the resistors 92, 94 and 96 and develops a voltage thereacross, which is further regulated or maintained against variation at any given temperature by Zener diode 90 that is connected across resistors 92 and 94. Resistor 92 is a temperature sensitive resistor located in the memory stack and varies its resistance in accordance with temperature variations of the memory stack to affect the voltage developed thereacross with temperature and, therefore, the level of the reference voltage.

The junction, identified by the point B between resistors 92 and 94, establishes a reference voltage, which for purposes of the illustrated embodiment may be +8 v. DC above the −28 v. DC load supply source, or −20 v. DC. The voltage at the junction point B is applied to the base of transistor 100, which is turned on from the reference voltage. Transistor 100 is operated in its linear region and, in addition to providing a compensating function, serves to minimize any fluctuations of the reference voltage when the regulator is turned on from the turn-on stage 108, as will be later described. The capacitors 98 and 106 connected to the input of transistors 100 and 118 are filter capacitors which serve to ground or de-couple any transient voltage spikes that may appear at the base of these transistors during turn on and operation of the regulator.

During this time, the current generator 109 of the regulator turn on stage 4 is off and holds transistor 114 nonconductive. The regulator output stage 5 is also nonconducting and held off by the −28 v. DC applied through resistor 116 to the input of the regulating section and to the anode of diode 104 of the compensating stage, which is reverse biased thereby.

Upon the application of a low logic level read or write timing input pulse signal to gate 108, the output of the gate drops to +0.2 v. DC to enable transistor 114 and clamp its emitter at a +0.8 v. DC potential. This clamp action allows transistor 114 to act as a constant current generator source supplying current from its collector. A part of this current flows through resistor 116 and develops a voltage drop thereacross that raises the potential at the upper end of resistor 116 in a positive going direction and forward biases diode 104 to permit current to flow therethrough and develop a voltage drop thereacross.

Another part of the current from transistor 114 is supplied to the base to drive transistor 118, whose collector receives operating bias through resistor 120 from the regulator clamp supply. Transistor 118 is rendered conductive and is operated in its linear region to drive the base of the output transistor 124. Transistor 124 is also rendered conductive and is operated in its linear nonsaturated region, permitting current to flow initially through the resistor 126 from the clamped regulator supply 17, which constitutes a constant voltage source.

The current from source 109 flowing through diode 104 develops a voltage drop thereacross in a direction or of a polarity to additively combine with the base-to-emitter voltage rise across transistor 100 and the reference voltage at point B. The sum of these voltages effectively appears across the resistor 116 connected to or across the input of the regulating section. The voltage across resistor 116 is made equal to the voltage appearing across resistor 126 plus the voltage drops across the base-to-emitter junctions of NPN transistors 118 and 124, so that the reference voltage is effectively forwarded and a voltage equal to the reference voltage appears across the current setting resistor 126.

Since the elements 100 and 104 are semi-conductor type devices, as are the transistors 118 and 124, the emitter-to-base voltage drop of PNP transistor 100 and the voltage drop across diode 104 will be nearly equal to or of the same order of magnitude as the base-emitter drops of the transistors 118 and 124. Thus, the voltage appearing across the resistor 126 is approximately equal to the reference voltage. Any initial variation between these potentials is adjusted by the adjustment of shunt trim resistor 128 to obtain the desired level of output current.

Since the regulating section, comprised of the transistor 118 and 124, is a high gain current amplifier and receives an essentially fixed base bias thereon, it operates as a constant current source, supplying a constant current from the collector of 124 established by the magnitude of the voltage across the fixed emitter resistance 126. The current in the collector circuit is the same as the emitter current, except for the small base current supplied from the driver, and is independent of changes in the load thereon. Thus, in distinction to the closed loop, sampling type regulators previously mentioned herein, the subject regulator might be characterized as a non-sampling, open loop type control regulator, as the output thereof is held at a constant level by the fixed bias and drive applied to the input thereof. The transistors 118 and 124 operate in their linear region away from saturation and permit of rapid switching operation compatible with the requirements of the load and supply a regulated current of relatively short pulse duration through the load.

The compensating elements, comprised of transistor 100 and diode 104, are junction type semi-conductor devices having similar temperature coefficients and voltage drops as the base-emitter junctions of the output stage transistors. All of these elements, viz., 100, 104, 118, and 124, are mounted on the same heat sink, represented by the dashed and dotted rectangle 130, so that the compensating elements will be exposed to the same thermal environment as the output transistors and will uniformly track with the temperature the variations of the $V_{be}$ junctions of the regulating transistors. Thus, the level of the compensation component of the total voltage applied to the input of the regulating section varies in accordance with the variations with temperature of the $V_{be}$ drops of the regulating section to maintain the voltage across the current setting element 126 constant and substantially equal to the reference voltage.

When the output or regulating section is switched on, the current through the collector-emitter junction of transistor 124 is initially supplied by the 12 v. DC clamp supply 17 and is held to a value of 400 ma. by the 8 volt drop corresponding to the reference voltage appearing across resistor 126 which is a precision 1% element of 20 ohms. The load 10 is shown in FIG. 1 as connected in circuit with the current regulator 1 through a current actuated switch 13 that is pulsed on through a gate 62 similar to the turn on gate 108 of the regulator. The gates 62 and 108 are preferably activated from the same timing control source to switch on the load with the current regulator.

When the current through the load attains the level at which it is regulated by the regulator, the regulator clamp diode 28 becomes back biased, and the potential at the collector of the output transistor 124 swings in a positive going direction from the −17 v. DC level, at which it was clamped by the clamp regulator supply 17, to the level of the voltage drop produced across the load by the current driven therethrough by the supply 16. Resistor 120, connected between the collectors of the transistors of the output regulating section, serves to damp any collector to base capacitance and to reduce or prevent any increase in base current drive due to the changes in voltage at the collector of the output transistor coupling through the collector to base inter-electrode capacitance thereof. After the current in the line has attained the level at which it is limited by the regulator, the line is driven essentially from a constant current source.

Figure 3:
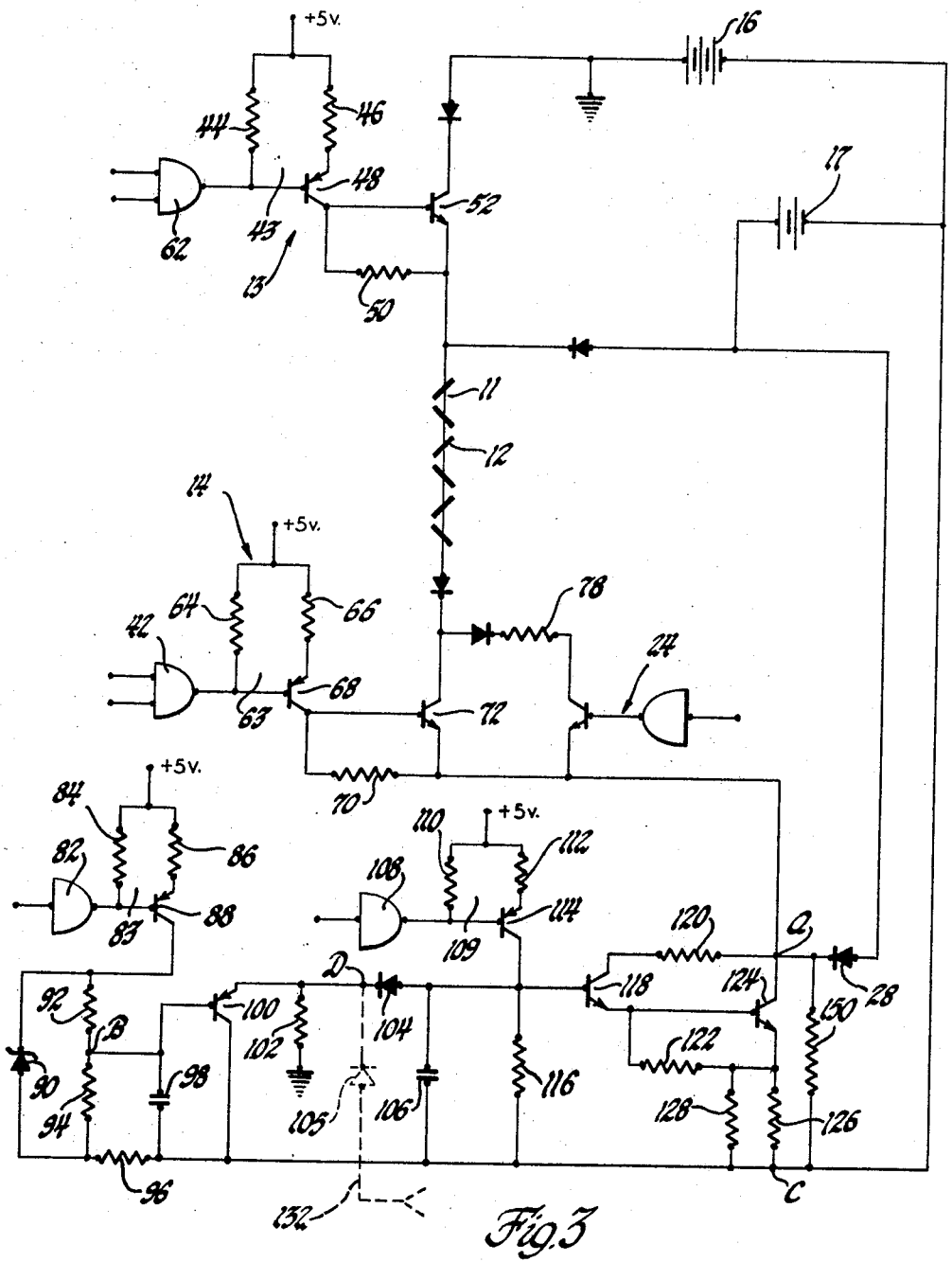
FIGURE 3 illustrates the use of the pulsed current regulator in a drive organization for a memory drive line of one axis of selection lines of a coincident current magnetic core memory device.

FIGURE 3 illustrates the use of the subject pulsed regulator in an application wherein the load comprises a memory drive selection line of one axis of a coincident current core memory device. A separate current regulator is used for each coordinate axis, X and Y, irrespective of the number of core stacks contained in the memory bank. Both regulators, however, share the same reference voltage supply section and those components of FIGURE 1 to the left of point D at the cathode of diode 104. The second regulator includes its own turn-on section, later to be described, and is connected through diode 105 to the common reference voltage section as shown by the broken line or bus connection 132. In addition to their individual compensating functions, the diodes 104 and 105 serve in an additional capacity to isolate one current regulator from the other.

Only one of the core selection lines 11 of one of the coordinate axes of the memory load 10 is shown in FIGURE 3 in which the cores on a line are identified by 12. The opposite ends of the line are connected through individual current actuated switches 13 and 14 to the stack power supply and potential source 16 and to the input point A of the current regulator, respectively.

Each of the switches 13 and 14 includes a turn-on gate 62 and 42, a constant current generator stage 43 and 63, and an output switching stage comprised of the transistor switches 52 and 72, respectively. The turn-on gates 42 and 62 are multiple input NAND gates of similar construction as the gates 82 and 108 employed in the current regulator. The gates provide a low logic level output therefrom upon coincidence of a low logic level read or write timing control pulse, derived from the same source as the timing pulse supplied to the turn-on gate 108 of the regulator, and a different combination of address bits supplied from an address register (not shown) to each of the switches.

The constant current generator stages 43 and 63 of each of the switches is of similar circuit configuration as the stages 83 and 109 of the regulator and respectively include a similar type PNP transistor 48, 68 connected through a base bias resistor 44, 64 and through an emitter connected resistor 46, 66, to the common +5 v. operating potential supply. The collector of each of the transistors 48, 68 is connected directly to the base of its respectively associated NPN transistor 52, 72 and through a leakage-path and turn-off bias providing resistor 50, 70 to the emitter of its corresponding output transistor whose emitter and collector electrodes are connected in series with the line.

The current from the constant current generator stage 43 driving the output NPN transistor 52 of the upper switch 13, divides and flows through the emitter of 52 and through resistor 50 into the line 11, which is driven from the stack supply 16. With the regulator turned on and the activation of the current switches 13 and 14, the current into the regulator, after the current in the line has attained its required level, will include the combined drive currents from the upper switch 13 and the lower switch 14 in addition to the current driven through the line by the stack supply 16. The regulator constitutes a source of constant current and maintains the sum of the aforementioned currents at a constant level for any given temperature. Thus, variations in any of the aforesaid components of current, as for example the currents operating the switches 13 and 14, will affect the current available for the drive line. Since the output current from the constant current generator stages 43 and 63 will vary with changes in the +5 v. operating supply or with variations of the V*be* drops of transistors 48 and 68 due to temperature changes, it is desirable to provide some manner of regulation of these currents so as not to affect the current through the line.

Such compensation is provided in the current regulator instead of in each of the individual selection switches 13 and 14, a considerable number of which are employed in the memory selection system. This compensation is accomplished through use of the trim resistor 96, which responds to any changes in the output current of transistor 88 of the power turn on stage 2 and affects the level of the reference voltage relative to the −28 v. side of the regulator. Thus, the magnitude of the voltage appearing across the current setting resistor 126 is proportionately varied to raise or lower the capacity of the regulator in respect to the current available therefrom or regulated thereby.

More particularly, the compensation is provided by using the same +5 v. DC supply for transistor 88 as transistors 52 and 72, using transistors of similar base-to-emitter characteristics, and mounting the current generating transistors of the various stages and selection switches in the same area to expose transistor 88 to the same thermal environment as the current generating transistors 48 and 68 of the line selection switches. Thus, factors tending to change the current driving the selection switches would similarly affect and be sensed by transistor 88, the current from which flows through resistor 92, 94 and 96 and would affect the voltage drop across resistor 96. The voltage drop across resistor 96 affects the level of the reference voltage forwarded or reflected across the current setting resistor 126, and, therefore, the magnitude of the regulated current.

The power turn on stage of the regulator serves an added function of preserving the data stored in the memory in the event of power failure by providing a quick shut-down of memory current drive. The falling voltage level is sensed early enough in the power supply to cause the removal of the enabling PND control to gate 82. This immediately removes the reference potential necessary to operate the regulator, and, thereby, cuts off all drive currents in the memory. Without this provision, the spurious and haphazard address, drive, and control signals associated with a power failure could render the resulting data stored in the memory unreliable for subsequent use.

FIGURE 2 illustrates another pulsed regulator turn-on stage that may be used in the regulator when a slow current rise time in the drive line is required, as in those cases where it is desired to drive the selection lines of one coordinate axis of a coincident current memory at a slower rate than the selection lines of the other coordinate axis in order to reduce shuttle noise in the output sense winding of the memory. The regulator turn-on stage illustrated in FIGURES 1 and 3 provides a relatively fast linear rise to the current in the drive lines of, say, the X coordinate axis supplied from the illustrated regulator. The drive lines of the other or the Y coordinate axis are supplied from another regulator, which is connected through diode 105 to the same reference voltage supply section as previously mentioned and is otherwise similar to the regulator FIGURES 1 and 3 but would employ the pulsed turn-on stage of FIGURE 2 connected therein at points corresponding to terminals labelled S and T in FIGURE 1.

The pulsed turn-on stage of FIGURE 2 comprises gate 134, the PNP transistors 136 and 138 and their associated elements mentioned in the description of the operation of FIGURE 2 presented below.

Prior to the application of a true level timing control pulse thereto, the output of gate 134 is low. The output of the gate is connected to one side of a voltage divider comprised of resistors 140 and 141, the other side of which is connected to the +5 v. DC supply. Under these conditions the potential at the junction point of the voltage divider connected to the base of transistor 136 is about +4.4 v. DC. This forward biases transistor 136, which is operated in a saturated condition. With transistor 136 conducting, diode 143 is reverse biased by the +5 v. DC present at the base of transistor 138. Transistor 138, therefore, is held in cut-off condition, since its emitter is also at a +5 v. DC potential. Accordingly, no current is supplied from the collector of transistor 138 to the base of transistor 118, which is also cut-off, whereby the regulator is in an inactive condition.

Upon receiving a true level logic input to gate 134, the output of the gate rises to +5 v. DC applied to the base of transistor 136, which is turned off. This allows capacitor 144 to charge from a +5 v. DC level to the −1 v. DC level of the now forward biased clamp diode 143, which is connected from ground through resistor 146 to −28 v. DC, and forward biases the emitter-to-base junction of transistor 138. Therefore, transistor 138 is turned on and allows current to flow through its collector, thereby activating the output stage of the regulator. Upon turn-on of transistor 138, its emitter is clamped above the level of the potential on its base by the amount of its base-to-emitter rise. With the emitter of transistor 138 clamped, the fixed voltage drop appearing across emitter resistor 146 generates a constant current to its emitter, whereby transistor 138 acts as a constant current source. The time delay of the regulator is accomplished by resistor 148 and capacitor 144, which form the time constant required to turn on (and off) transistor 138. Operation of the regulator after the turn-on of transistor 138 is the same as discussed previously.

Since the transistors 118 and 124 are operating in their non-saturated regions, they are capable of high speed switching operation. Thus, with the fast turn on (and turn-off) regulator stage of figures 1 and 3, the switching speed of the output regulating section of the regulator can be faster than that if the current activated line selection switches 13, 14 in which the switching transistors are operated in their saturated mode. In such case it will be seen that the width of the pulse driven through the line is determined by the regulator itself and is independent of the characteristics of the line selection switches. This factor plus the characteristic enabling the regulator to be switched on and off results in minimal regulator on time and, hence, minimum power consumption.

A resistor 150 of high ohmic value, 10K for example, is provided across the regulator and serves to provide a path for the current, driven by the stack supply, to flow through the drive line and the inductive energy discharge termination circuit 24 to the low potential side of the stack supply when the turn off of the regulator is faster than the selection switches. The circuit 24 is turned on as the current actuated switches 13 and 14 are turned off and serves to provide a discharge path for the inductive energy of the line through resistor 78 and to hold the lines of the stack at a fixed potential during memory idle periods.

With the slow turn-on (turn-off) stage of FIGURE 2, the line selection switches shut-off before the current regulator, so that the current flowing in the line due to the inductive character thereof is driven by the regulator clamp supply through the output stage of the regulator until the regulator shuts off.

It is to be understood that the foregoing description refers to an illustrative embodiment of the invention and is not to be construed in the limited sense.

We claim:

1. A switched, open loop type current regulator for regulating the amplitude of a pulse of current driven through a load by a source of driving potential and comprising, in combination, a voltage reference stage, a normally nonconducting current regulating stage decoupled from said voltage reference stage and including a current level setting element serially connected therethrough to the load and source of driving potential, a source of external control pulses, and a pulsed regulator turn on stage including a normally nonconducting current generating source connected between said voltage reference stage and said current regulating stage and responsive to an external control pulse applied thereto to render said current regulating stage conductive, said current generating source coupling said reference voltage to said current regulating stage to fix the voltage across said current setting element at a level approximately equal to the reference voltage for the duration of said external control pulse.

2. A current regulator in accordance with claim 1 wherein the power requirements of the load vary with temperature and wherein the voltage reference stage includes temperature sensitive means that is subjected to the same thermal environment as said load and modifies the reference voltage in accordance with the effect of temperature on the power requirements of the load.

3. A current regulator in accordance with claim 1 wherein said current regulating stage includes a normally nonconducting cascaded pair of transistors connected in an emitter follower configuration and driven into conduction from said current generating source to produce a constant current available to the load therefrom.

4. A current regulator in accordance with claim 3 including compensating means connected between the voltage reference stage and the current regulating stage and providing a compensating voltage to the current regulating transistor stage for the voltage drops across the base-to-emitter junctions of the transistors thereof to render the voltage across said current setting element substantially equal to the reference voltage.

5. A current regulator in accordance with claim 4 wherein the compensating means compensate the base-emitter junctions of the regulating transistors both for voltage drop and temperature variation.

6. A current regulator in accordance with claim 5 wherein the regulating transistors are junction type semiconductor devices and the compensating means includes junction type semiconductor means mounted with the regulating transistors on means defining a common thermal plane.

7. A switched current regulator in accordance with claim 6 wherein said voltage reference stage includes a constant current generator, a voltage divider connected to receive current from said constant current generator, and a break-down diode connected across the voltage divider and wherein said compensating stage includes a transistor connected in an emitter follower output configuration with its base connected to the junction of the voltage divider and diode connected between the emitter of said transistor and the current regulating stage.

8. A switched type current regulator for regulating the amplitude of a pulse of current driven through a load from a source of driving potential and comprising, in combination, a voltage reference stage providing a fixed reference voltage therefrom, a current regulating stage including normally nonconducting current regulating means connecting a current setting element in series with the load, a source of external control pulses, a pulsed turn-on stage including normally inactive current generating means connected to said current regulating stage and activated in response to an external control pulse to drive said current regulating means into conduction, and a compensating and reference voltage transfer stage including compensating means connected between the reference voltage stage and said current regulating stage and driven by said current generating means to adjust the level of the reference voltage transferred through the compensating stage to the current regulating stage by an amount corresponding to the voltage drop produced within said current regulating means by the driving current supplied thereto, whereby the voltage across said current setting element is substantially equal to said fixed reference voltage.

9. A switched type current regulator in accordance with claim 8 wherein said current regulating means comprises a high gain current amplifier including a cascaded pair of transistors connected in an emitter-follower output configuration and wherein said compensating means compensates the base-emitter junctions of said transistors both for voltage drop and for variations with temperature.

References Cited

UNITED STATES PATENTS 3,250,922  5/1966  Parham.
3,408,557  10/1968  Horgan et al. _____ 323—1

LEE T. HIX, Primary Examiner

U.S. Cl. X.R.
323—38